UNITED STATES PATENT OFFICE.

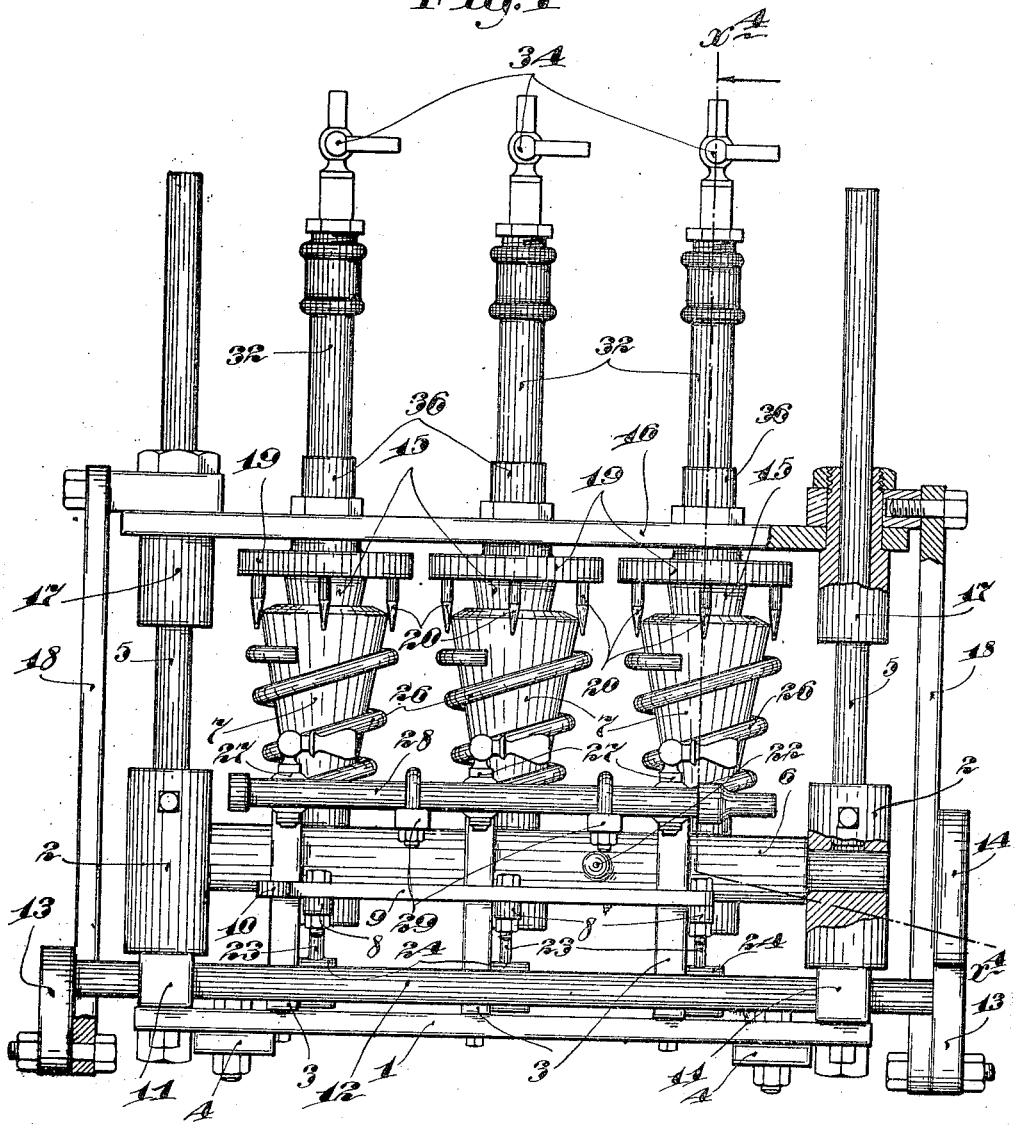

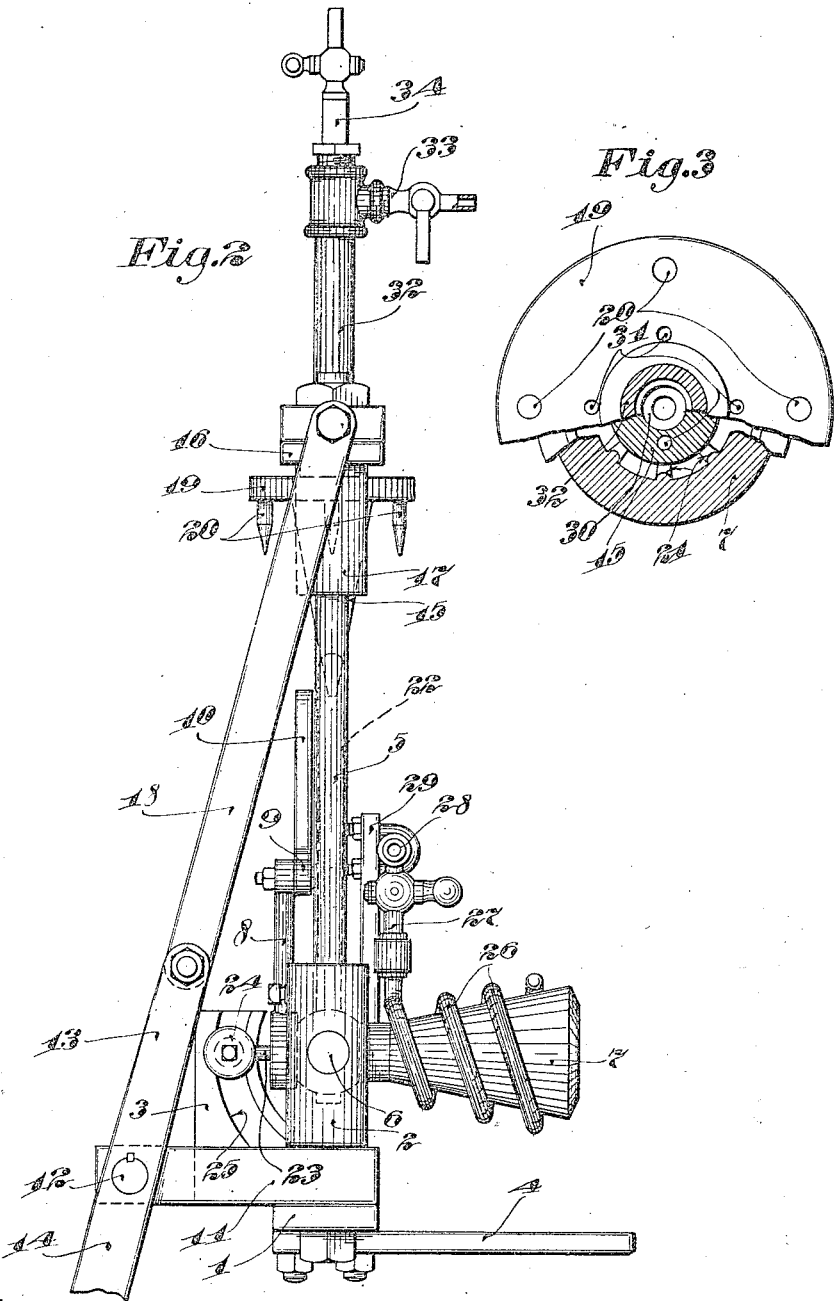

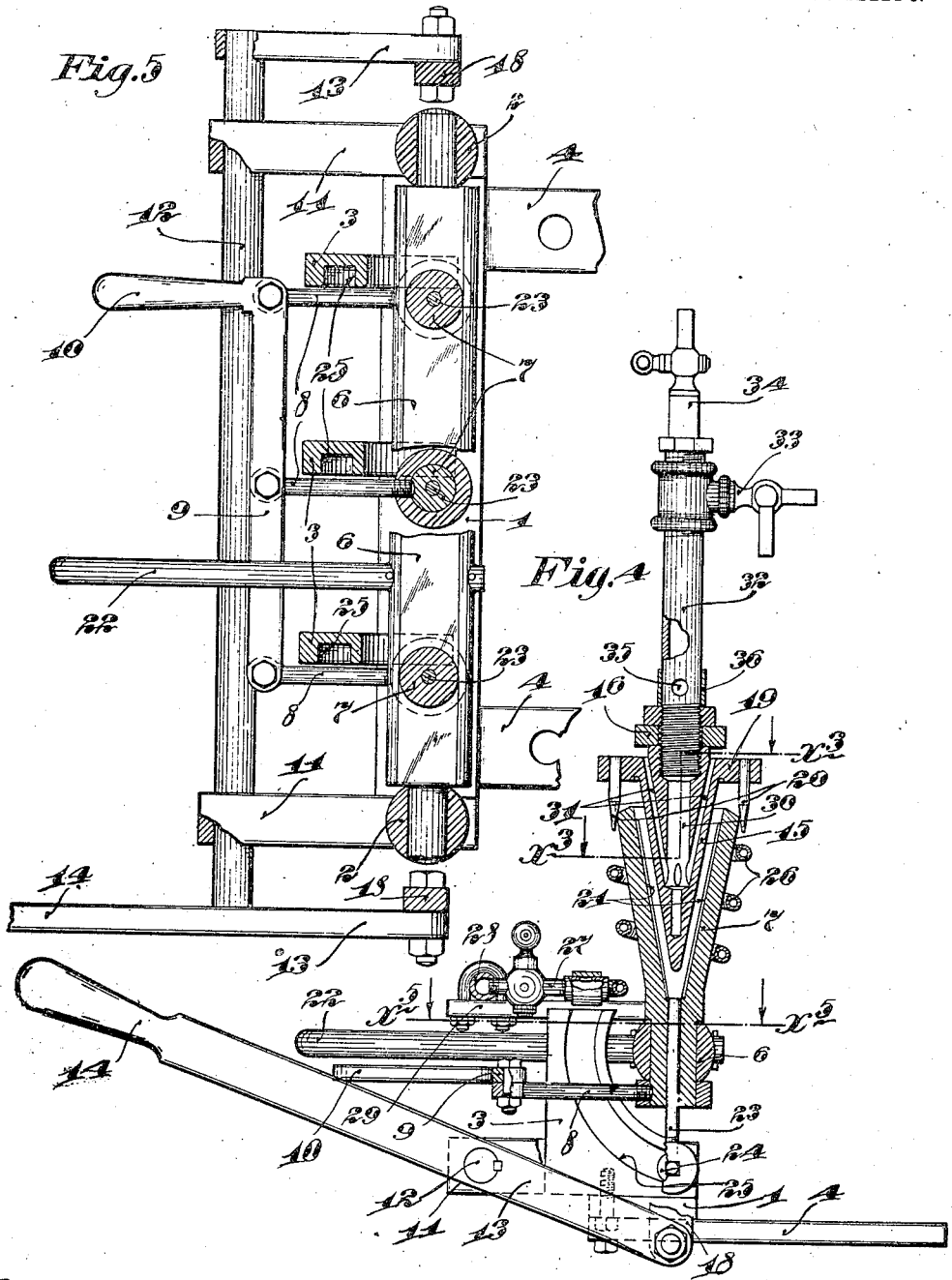

ROBERT G. CARGILL, OF MINNEAPOLIS, MINNESOTA, ASSIGNOR TO STANDARD BAKING COMPANY, OF MINNEAPOLIS, MINNESOTA, A CORPORATION OF MINNESOTA.

MACHINE FOR BAKING ICE-CREAM CONES.

1,127,401.   Specification of Letters Patent.   Patented Feb. 9, 1915.

Application filed June 28, 1913. Serial No. 776,427.

*To all whom it may concern:*

Be it known that I, ROBERT G. CARGILL, a citizen of the United States, residing at Minneapolis, in the county of Hennepin and State of Minnesota, have invented certain new and useful Improvements in Machines for Baking Ice-Cream Cones; and I do hereby declare the following to be a full, clear, and exact description of the invention, such as will enable others skilled in the art to which it appertains to make and use the same.

This invention has for its object to provide an improved machine for baking ice cream cones and similar articles, and to such ends, generally stated, the invention consists of the novel devices and combinations of devices hereinafter described and defined in the claims.

The invention is illustrated in the accompanying drawings wherein like characters indicate like parts throughout the several views.

Referring to the drawings, Figure 1 is a view in front elevation showing the improved machine, some parts being sectioned; Fig. 2 is a side elevation of the improved machine; Fig. 3 is a detail taken in section approximately on the irregular line $x^3$ $x^3$ on Fig. 4; Fig. 4 is a view partly in side elevation and partly in vertical section on the line $x^4$ $x^4$ on Fig. 1; and Fig. 5 is a horizontal section taken approximately on the line $x^5$ $x^5$ on Fig. 4, some parts being broken away.

The relatively fixed framework of the machine, as shown, comprises a base plate 1 having rigidly secured end bearings 2 and intermediate cam plates 3. The said plate 1 is provided with rigidly secured laterally projecting horizontal bars 4 that are adapted to be bolted, or otherwise rigidly secured to a bench or table. Upright and parallel guide columns 5 are rigidly seated in and project upward from the end bearings 2. A heavy rocking bar 6 is provided with trunnions at its ends journaled in the fixed bearing 2, and the hollow outer cones 7, of which there may be any desired number, are provided at their lower ends with trunnions that are suitably seated in the said rocker bar 6, and are provided at their lower ends with radially projecting arms 8. Said arms 8 are connected to a common tie bar 9, so that all of the several outer cones 7 will receive simultaneous oscillatory movements. The tie bar 9 is provided with a projection 10 that serves as a hand piece or lever for simultaneously oscillating all of the said outer cones 7, for a purpose which will presently appear.

The end bearings 2 are provided with forwardly projecting arms 11 in which a rock shaft 12 is journaled. This rock shaft 12, at its ends, is provided with arms 13, one of which has an extension 14 that serves as an operating lever.

The inner cones 15 are secured to a common oscillatory horizontal supporting bar 16, which, at its ends, is provided with sleeve-like bearings 17 that slide vertically on the guide columns 5. Links 18 connect the arms 13 to the said bearing 17, and so that by oscillatory movements of the operating lever 14, the said inner cones 15 may be simultaneously raised and simultaneously lowered at will. To the extreme upper ends of the inner cones 15 are secured disk-like heads 19 that have circumferentially spaced conical pointed pins 20, engageable with the upper outer edges of the outer cones 7 to insure accurate centering of the coöperating inner and outer cones, when the latter are moved downward into the former. The outer cones 7 are formed with internal circumferentially spaced longitudinally extended ribs 21 which will produce slight corrugations or grooves in the outer surfaces of the baked cones.

The rocker bar 6 is provided with a radially projecting operating lever 22, by means of which it may be oscillated to move the outer cones 7 from their vertical positions shown in Figs. 1 and 4, into or slightly below the position shown in Fig. 2.

Working through the lower ends of the outer cones 7 are ejecting plungers 23, which, at their lower or outer ends, are provided with roller-equipped studs 24, that work in cam grooves 25 of the cam plates 3. The cam grooves 25 are eccentric to the axis of the rocker bar 6, the upper portions thereof being nearer to the said axis than are the lower portions of the said cam grooves. The arrangement is such that when the outer cones are in vertical positions the upper ends of the ejecting plungers 23 will be at the extreme bottoms of the hollow conical interiors of the said outer cones, but when the said outer cones are oscillated into approximately horizontal positions, the ejecting plungers, by the action of the lower equipped studs 24, and coöperating cam grooves 25, will move the said ejecting plungers inward and thus force the baked cones from the respective outer cones 7. Obviously, movements of the outer cones 7 from their horizontal, back into their vertical positions, will cause downward retractions of the ejecting plungers 23.

The inner and outer cones 7 and 15 may be kept hot either electrically or by gas burners, and in the drawings, suitable gas burners are illustrated, applied thereto and which, briefly described, are as follows: For heating the outer cones 7, perforated spiral burner pipes 26 are placed around the same. These pipes 26 are, as shown, connected by short valve-equipped pipes 27, to a gas supply pipe 28 that is connected to a suitable source of gas supply. The said pipe 28, as shown, is supported by short metal bars 29 rigidly secured to the rocker bar 6. For heating the inner cones 15, they are, as shown, provided with axial conduits 30 and oblique discharge conduits 31. Tubes 32 are screwed into the upper ends of the said inner cones 15 and commingled with the axial conduits 30 thereof. At their upper ends, the tubes 32 are provided with valve-equipped nipples 33 and 34 to which air and gas supply pipes, respectively, are adapted to be attached. When the air and gas supply pipes 33 and 34 are opened, a mixture of air and gas will be delivered into and may be burned within the inner cones 15. The tube 32 is provided with a lateral opening 35 and with a valve, in the form of a sliding collar 36, for opening and closing said port 35. When the port 35 is opened, the commingled air and gas may be ignited by inserting a burning match into the said port.

Operation: The operation is substantially as follows: The dough will be inserted into the hollow outer cones 7 while they are in upright positions shown in Figs. 1 and 4, and while the inner cones 15 are raised, as shown in Fig. 2. After the dough has been inserted, the inner cones 15 are lowered into the outer cones, by an upward oscillatory movement of the operating lever 14. After the cones have been baked, the lever 14 is slightly depressed so as to slightly raise the inner cones 15, and under this operation, the baked cones, which will adhere to the inner cones, will be slightly raised within the outer cones. The said inner cones, with the baked cones adhering thereto, are immediately again lowered into the outer cones, and then by manipulation of the lever 10, the outer cones 7 are given a simultaneous oscillatory movement. When the outer cones are thus oscillated, the ribs 21 thereof will cause the baked cones to oscillate therewith, and hence, to loosen themselves from the inner cones 15. This being done, the inner cones 15 are again raised by manipulation of the lever 14. Next, the outer cones 7 with the baked cones loosely held therein, are, by manipulation of the lever 22, turned into the position shown in Fig. 2, or to a slightly lower position, and under such movement as already indicated in a general way, the ejecting plungers 23, by coöperation of the roller-equipped notches 24 and cam grooves 25, will be forced into the said outer cones and will push the baked cones nearly or quite out of the same. Said cones 7, being then turned back to upright positions, are again ready to be filled, and the operations above described be repeated.

This machine, while of simple construction, has, in practice, been found highly efficient for the purposes had in view. In the drawings, only three cones 7 and three coöperating cones 15 are shown, but in practice, a very much larger number would be employed.

While the machine is especially adapted to bake what is known as ice cream cones, it is obvious that by the proper modification in the form of the inner and outer cones, of the coöperating mold members, articles of various other design may be formed.

What I claim is:

1. In a machine for making ice cream cones and the like, the combination with a plurality of outer mold members mounted for rotary movements on their own axes and for common oscillatory movement to and from upright positions, of coöperating inner mold members mounted for vertical movements to and from said outer mold members.

2. In a machine for making ice cream cones and the like, the combination with a plurality of outer mold members mounted for rotary movements on their own axes and for common oscillatory movements to and from upright positions, of coöperating inner mold members mounted for vertical movements to and from said outer mold members, ejecting plungers applied to said outer mold members, and means for moving said ejecting plungers into said outer mold members when the latter are oscillated from their operative positions.

3. In a machine for making ice cream cones and the like, the combination with a plurality of outer mold members mounted for rotary movements on their own axes and for common oscillatory movements to and from upright positions, of coöperating inner mold members mounted for vertical movements to and from said outer mold members, said inner mold members having circumferentially spaced centering pins engageable with said outer mold members to properly aline the two mold members.

4. In a machine for making ice cream cones and the like, the combination with a frame having upright guides, of a rocker bar journaled to said frame, a plurality of mold members journaled to said rocker bar for rotary movements in respect thereto, and for oscillatory movements therewith, to and from upright positions, arms projecting from said outer mold members, a link connecting said arms for common movements, a supporting bar mounted for vertical sliding movements on said upright guides, a rock shaft with connections to said bar for vertically moving the same, and a plurality of inner mold members carried by said vertically movable bar to and from the coöperating outer mold members.

5. In a machine for making ice cream cones and the like, the combination with a framework having upright guides, of a rocker bar journaled to said frame, a plurality of outer mold members journaled to said rocker bar, connections between said mold members for simultaneously rotating the same on their own axes, means for oscillating said bar to simultaneously move said mold members to and from upright positions, a supporting bar mounted for vertical movements on said upright guides, means for vertically moving said supporting bar, a plurality of inner mold members carried by said vertically movable guides to and from the coöperating outer mold members, ejecting plungers working through the lower ends of said outer mold members, and fixed cams operating on the projecting ends of said ejecting plungers to automatically force the same into said inner mold members when the latter are moved from their upright into their discharging positions.

In testimony whereof I affix my signature in presence of two witnesses.

ROBERT G. CARGILL.

Witnesses:
HARRY D. KILGORE,
F. D. MERCHANT.